(12) United States Patent
Osaki (10) Patent No.: US 6,985,321 B2
(45) Date of Patent: Jan. 10, 2006

(54) HEAD SUSPENSION ASSEMBLY MOUNTING NONVOLATILE MEMORY AND MAGNETIC DISK DEVICE

(75) Inventor: Akira Osaki, Odawara (JP)

(73) Assignee: Hitachi, Ltd., Tokyo (JP)

( * ) Notice: Subject to any disclaimer, the term of this patent is extended or adjusted under 35 U.S.C. 154(b) by 65 days.

(21) Appl. No.: 10/795,328

(22) Filed: Mar. 9, 2004

(65) Prior Publication Data

US 2004/0169951 A1  Sep. 2, 2004

Related U.S. Application Data

(63) Continuation of application No. 09/785,283, filed on Feb. 20, 2001, now Pat. No. 6,707,628.

(30) Foreign Application Priority Data

May 15, 2000 (JP) .............................. 2000-142054

(51) Int. Cl.
*G11B 5/02* (2006.01)
(52) U.S. Cl. ..................... 360/55; 360/244.1; 360/69; 360/46
(58) Field of Classification Search .................... None
See application file for complete search history.

(56) References Cited

U.S. PATENT DOCUMENTS 6,278,583 B1 *  8/2001  Adley .................... 360/244.1
6,714,383 B2 *  3/2004  Kado et al. ............. 360/244.1

FOREIGN PATENT DOCUMENTS

| JP | 5-159534 | 6/1993 |
|---|---|---|
| JP | 6-162418 | 6/1994 |
| JP | 7-078302 | 3/1995 |
| JP | 7-134805 | 5/1995 |
| JP | 2000-090404 | 3/2000 |

* cited by examiner

*Primary Examiner*—David Hudspeth
*Assistant Examiner*—Dan I Davidson
(74) *Attorney, Agent, or Firm*—Antonelli, Terry, Stout and Kraus, LLP.

(57) ABSTRACT

A head suspension assembly having a magnetic head, an arm which is supported so as to rotate, a suspension having one end which is fixed to an end of the arm and an other end which mounts the magnetic head, a nonvolatile memory which is mounted on the suspension assembly, and stores control parameters of the magnetic head, a connecting terminal which is mounted to the arm, and a signal transmission line which electrically connects the connecting terminal to the nonvolatile memory and the magnetic head. The connecting terminal enables transmission of signals at least one of to and from the head suspension assembly, the nonvolatile memory and the magnetic head.

7 Claims, 7 Drawing Sheets

HEAD SUSPENSION ASSEMBLY MOUNTING NONVOLATILE MEMORY AND MAGNETIC DISK DEVICE

CROSS REFERENCE TO RELATED APPLICATION

This is a continuation of U.S. application Ser. No. 09/785,283, now U.S. Pat. No. 6,707,628 filed Feb. 20, 2001, the subject matter of which is incorporated by reference herein.

BACKGROUND OF THE INVENTION

This invention relates to a magnetic disk device, especially to a magnetic disk device which is capable of storing control parameters specific to the magnetic disk device into a nonvolatile memory, and to a head suspension assembly for use in the magnetic disk device.

Generally, a magnetic disk device operates with plural magnetic disks, each having a magnetic layer which records data and is formed on a non-magnetic substrate, and the plural magnetic disks are stacked on a rotating shaft of a spindle motor. The magnetic disk device has magnetic heads for recording and reproducing data, which magnetic heads are each mounted on one end of a respective suspension, the other end of which is fixed to an end of an arm so as to be positioned on a respective one of the magnetic disk surfaces. The arm is driven by an actuator in response to a positioning signal. In a hard disk device having the above structure, the magnetic head is arranged so as to access a desired position while floating at a height of tens of manometers above the fast rotating magnetic disk surface during the recording and reproduction of data.

Data is recorded or reproduced to or from a track in the form of concentric circles on the magnetic disk by the magnetic head. Generally, a sequence of operations of the magnetic disk device is controlled by an MPU (Micro Processing Unit) that executes control programs based on control parameters that are stored in a nonvolatile memory or have been transferred into RAM (Random Access Memory) from the nonvolatile memory.

The magnetic disk device has various management data as follows: the device operation mode designed for each customer, such as ON/OFF operation of a cache and the setting of a master/slave status, parameters to be set up for each magnetic head, such as an optimum recording current and an optimum bias current obtained from recording and reproducing characteristics of each magnetic head, a physical offset position of a recording head and a reproducing head (hereafter referred to as the offset position), the amplifying gain of a head amplifier, and parameters to be set up for each magnetic head or data zone, such as filter constants. This management data will vary in every drive, and rewriting is required for a change of the set-up. Therefore, this data is generally stored in a semiconductor memory that operates as a nonvolatile rewritable memory, such as an EEPROM (Electrically Erasable and Programmable Read Only Memory) or a FROM (Flash Read Only Memory), or it may be stored in a management data area provided on a part of the magnetic disk.

According to recent trends toward downsizing and increasing the storage capacity of a magnetic disk device, a high performance magnetic head is required. As the high performance magnetic head, a composite type magnetic head comprising an individual reproducing head and a recording head is used. In this type of head, a MR (Magnetoresistive) head or a GMR (Giant Magnetoresistive) head is used for the reproducing head, and an inductive head formed by thin film technology is used for the recording head.

This type of head has complex structures, fluctuations in quality through the manufacturing process are larger, and recording and reproducing characteristics considerably vary in every magnetic head. To enable stable recording and reproducing at the desired recording density, only magnetic heads having a good characteristic must be assembled. For this purpose, before the magnetic head is assembled in the magnetic disk device, generally the recording and reproducing characteristics of a magnetic head in the form of a head suspension assembly (an assembly structure including suspensions which are provided for each recording and reproducing head, and an arm) are measured, and good magnetic heads are selected.

Items to be measured are resistance of the MR head, the physical positions (offset value) of the reproducing head and the recording head, the reproducing output voltage, the reproducing resolution, the over write characteristic, and the noise characteristic. At the time of measurement, the recording current of the recording head and bias current of the reproducing head are varied individually, and an optimum recording current and an optimum bias current are obtained.

In addition to an increase in the data transfer rate of the magnetic disk device, deterioration of the output signal is prevented by cutting down the length of a signal transmission line by mounting a head amplifier, which amplifies the reproducing signal from the magnetic head and drives the recording head, on the suspension or the arm (called a chip-on-suspension or chip-on-arm type). In this case, during the selecting measurement of the head mounted on the suspension assembly, the performance is evaluated with an output signal of the head amplifier, which shows integrated characteristics of the magnetic head characteristics and the head amplifier characteristics.

SUMMARY OF THE INVENTION

As described above, at the time of selecting measurement of the head mounted on suspension assembly, the optimization of the control parameters is executed by the following measurements: the measurement of the optimum recording current of the recording head, the measurement of the optimum bias current of the reproducing head, the measurement of the offset position of the recording head and the reproducing head, and the measurement of the head amplifier gain; and, the acceptance or rejection of each magnetic head is determined by setting up the optimum controlling parameter for each magnetic head. But these optimized control parameters are not memorized, and, at the time of shipping inspection of the magnetic disk device, a similar optimization procedure is executed again.

At the time of shipping inspection of the magnetic disk device, since the optimum recording current and the optimum bias current of each magnetic head are not known, a default value sufficient for starting the magnetic disk device is set up. The value to be set up is obtained from sampling the characteristics of plural magnetic disk devices, and it is a value designed to secure characteristic which will not to disturb operation of the magnetic disk drives during the shipping inspection; therefore, the default value will not correspond to the variation of the characteristics of each magnetic head, and it ma y happen that some of the magnetic disk drives are rejected at the time of shipping inspection of the magnetic disk devices for this reason. For example, at the time of shipping inspection of the recording and reproducing characteristic under the condition that the bias current of the reproducing head is set to a default value rather than to the optimum value for each head, it is possible that, if the default value is close to the upper or lower allowable limit of the inspected magnetic head, the inspected magnetic disk device will be rejected at the time of shipping inspection for failing to meet the required recording and reproducing characteristics. Therefore, there has been a problem that the yield is poor in the production of the devices.

Further, if the head suspension assembly is that of the chip-on-suspension type or chip-on-arm type, there is a drawback in that the signal level amplified by the head amplifier is merely evaluated at the time of selection measurement of the magnetic head of the head suspension assembly, and the signal level at the output terminals of the magnetic head cannot be measured accurately, since as the output signal is determined by the integrated characteristics of both the magnetic head and the head amplifier.

The present invention mainly uses the following structures:

A head suspension assembly which comprises an arm supported so as to rotate, an elastically flexible suspension having one end thereof fixed to an end of said arm and a magnetic head mounted on the other end thereof, and a signal transmission line which is fixed on said suspension and said arm and connects said magnetic head to a main FPC, wherein a nonvolatile memory which stores the control parameters of said magnetic head is mounted on the arm and said nonvolatile memory is electrically connected to said signal transmission line.

A head suspension assembly, which comprises an arm supported so as to rotate, an elastically flexible suspension having one end thereof fixed to an end of said arm and a magnetic head mounted on the other end thereof, and a signal transmission line which is fixed on said suspension and said arm and connects said magnetic head to a main FPC, wherein a head amplifier which transmits and receives signals to and from said magnetic head and a nonvolatile memory which stores the control parameter of said magnetic head and said head amplifier are mounted together on the arm, and said head amplifier and said nonvolatile memory are electrically connected to said signal transmission line.

A magnetic disk device, which comprises a magnetic disk, a read write circuit, a head suspension assembly which has a magnetic head, an arm supported so as to rotate, an elastically flexible suspension having one end thereof fixed to an end of said arm and a magnetic head mounted on the other end thereof, and a signal transmission line fixed on said suspension and said arm which connects said magnetic head to a main FPC, a storing means which stores control parameters specific to the magnetic disk device and the control parameters corresponding to an operating mode of the magnetic disk device, and control means which inspects or controls the magnetic disk device based on control programs and said control parameters stored in said storing means. Wherein, a nonvolatile memory, which stores optimized control parameters of the magnetic head obtained at the inspection of said head suspension assembly, is mounted on said head suspension assembly, and, at the time of inspection of the magnetic disk device, said control means operates to read out the default control parameters stored in said storing means together with the optimized control parameters stored in said nonvolatile memory for use in carrying out the inspection.

DESCRIPTION OF THE PREFERRED EMBODIMENTS

A head suspension assembly including a nonvolatile memory, and a magnetic disk device using it, which represent a preferred embodiment of the present invention, will be described with reference to FIG. 1–FIG. 7.

Figure 1:
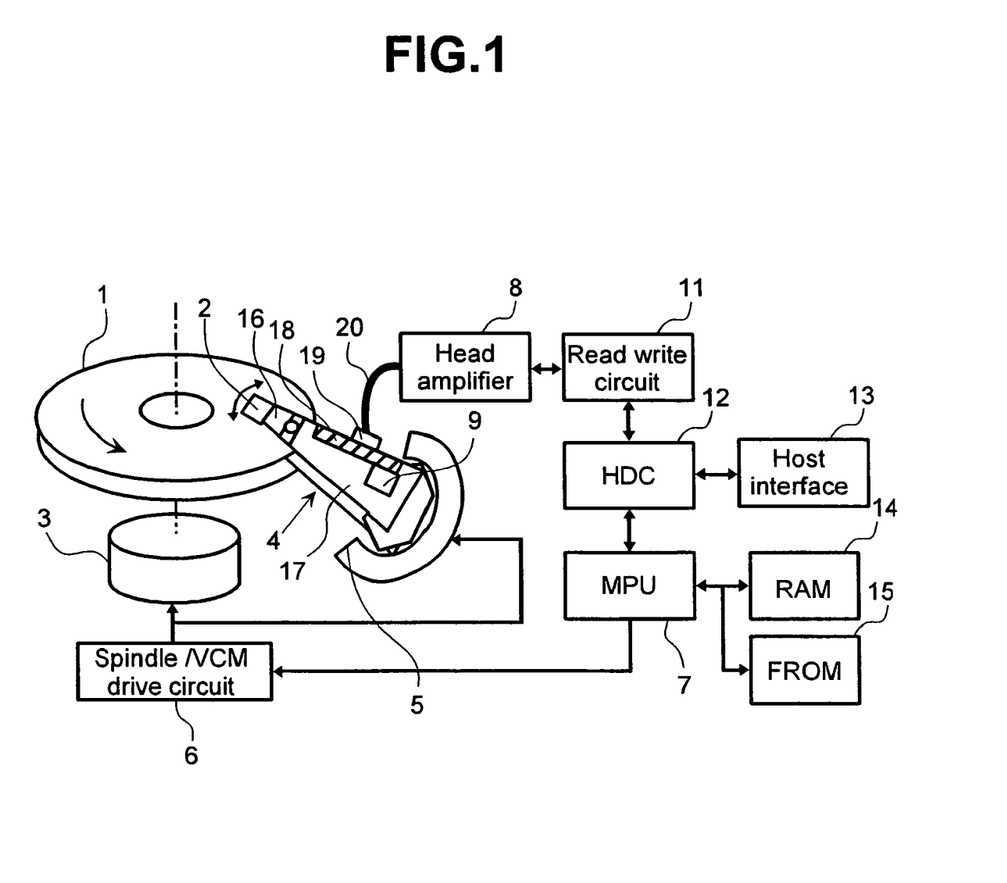
FIG. 1 is a schematic block diagram illustrating the whole structure of a magnetic disk device representing a first preferred embodiment of the present invention.

FIG. 1 illustrates the overall structure of a magnetic disk device representing a first preferred embodiment of the present invention. In FIG. 1, a magnetic disk 1 serves as a medium for recording or reproducing data, and a magnetic head 2 operates as a transducer for writing (recording) data to the magnetic disk 1 and reading (reproducing) data from the magnetic disk 1. Generally, a plurality of the magnetic disks 1 are stacked and one magnetic head 2 is placed on each data surface of each magnetic disk, respectively.

A magnetic layer on which to record data is formed on the surface of the magnetic disk 1, and a plurality of data tracks in the form of concentric circles are formed on the magnetic disk surface beforehand, which data tracks are divided in the radial direction into plural zones, for example, twelve zones consisting of zone 0, zone 1 . . . and zone 11, and each zone comprises plural data tracks. Plural servo areas for recording servo data, which are necessary for positioning control of a head carriage assembly, are provided in each track. An area between the servo areas is a user area, and plural data sectors are formed in the user area. Generally, the user data is recorded in the data sectors. Further, a management data area for storing management data, which is required for the operation of the drive, is provided in a specified user area. The head suspension assembly has a structure comprising suspensions provided for each magnetic head and a corresponding arm; and, the head carriage assembly has a structure comprising a group of suspensions, each provided for a respective magnetic head corresponding to one of the stacked magnetic disks, and a group of the arms.

The magnetic disk 1 is rotated at high speed by a spindle motor 3. The head carriage assembly, which mounts the magnetic heads 2 at its front edge, is swung by a voice coil motor 5 and moves the magnetic heads 2 to any target position on the magnetic disk. The spindle motor 3 and the voice coil motor 5 are connected electrically to a spindle/VCM drive circuit 6. The spindle/VCM drive circuit 6 drives the voice coil motor by supplying a control current to the voice coil motor 5, and it also drives the spindle motor 3 by supplying a control current to the spindle motor 3. The spindle/VCM drive circuit 6 is controlled by the MPU 7.

Each magnetic head 2 is electrically connected to a head amplifier 8 through a main flexible printed circuit board (FPC) 20 and a flexible printed circuit board (FPC) 18 fixed on a suspension 16 and an arm 17, which comprise the head suspension assembly 4. The head amplifier 8 amplifies the reproducing signal read by the reproducing head of the magnetic head 2, and it drives the recording head of the magnetic head 2 by converting digital write signal data received from a read/write circuit 11 into an analog signal waveform. This head amplifier 8 also writes and read data to and from the nonvolatile rewritable memory, as will be described below.

Read/write circuit 11 has a decoding function that decodes an analog input signal transmitted from a head amplifier 8 to original data, which is necessary for the data reproducing operation. For example, this decoding function is realized by a PRML (Partial Response Maximum Likelihood) reproducing circuit. This reproducing circuit has a well-known circuit structure comprising an auto gain control amplifier, a low pass filter, an analog-to-digital converter, an equalizer, a Viterbi detector, and a PLL circuit (these circuits are not shown).

The read/write circuit 11, in addition to the above-described decoding function, has an encoding function, which is a signal processing function required for recording data to the magnetic disk, and a reproducing function for reproducing the servo data required for the servo control process, such as head positioning control. MPU 7 controls every function of the magnetic disk device according to control program and a control parameters stored in the Flash ROM (FROM 15), which will be described later. Namely, it executes well-known controls, such as positioning control to move the magnetic head 2 to a target position on the magnetic disk 1, and control for transferring recording and reproducing data by controlling the HDC (Hard Disk Drive Controller) 12.

In an initializing process, after turning on the power of the magnetic disk device, the MPU 7 controls the transfer of management data, namely various control parameters specific to each device and the operating mode, which are stored in the FROM 15, to a RAM 14, and also controls the storing of management data in the FROM 15 corresponding to a FROM set command received from a host PC through a host interface. The MPU 7 is connected to a nonvolatile rewritable FROM 15, which stores control programs (firmware) for controlling every function of the magnetic disk device, and a rewritable volatile RAM 14, which is used as a work memory area of the MPU 7 and an area for storing of the control parameters and the operating mode that the MPU 7 uses in the operation of the magnetic disk device. The HDC 12 controls communications of commands and data with the host PC through the host interface. The HDC 12 also controls the data communication with the read/write circuit.

As control parameters used in the control programs of the magnetic disk device, there are control parameters specific to the device which are not dependant on each of the magnetic heads, control parameters concerning the operating mode of the device and parameters depending on each of the magnetic heads. As parameters specific to the device which are not dependant on the magnetic head, there are the serial number of the device, the revision number of the firmware, and defect address data that records positions of defects on the magnetic disks. As the parameters concerning the operating mode of the device, there are the waiting time during which rotation of the spindle reaches the normal speed after turning on the power, the operating mode depending whether the spindle is spun up or not just after the turning on power (Power On spin up mode), the master/slave operating mode, and the ON/OFF status of a cache memory. As the control parameters depending on each magnetic head, there are the recording current of the magnetic head, the bias current of the reproducing head, the resistance of the reproducing head, the offset value of the recording head and reproducing head, the amount of overshoot of the rerecording current waveform, the amount of write pre-compensation, the cutoff frequency of a low pass filter (LPF), and the amount of boost of a LPF. These control parameters depending on each magnetic head can be set up to an optimum value corresponding to characteristics of each zone formed on the magnetic disk.

The nonvolatile memory 9 is a rewritable EEPROM which stores merely the parameters depending on each of the magnetic heads among the above-described control parameters. In the selecting measurement of the magnetic heads of the head suspension assembly, the operating parameters optimized with an adjustment are recorded by the MPU of a selection tester. After the magnetic heads are assembled into the magnetic disk device, at the time of shipment inspection of the magnetic disk device, the MPU 7 reads out the control parameters through the head amplifier, the read/write circuit, and HDC.

Figure 2:
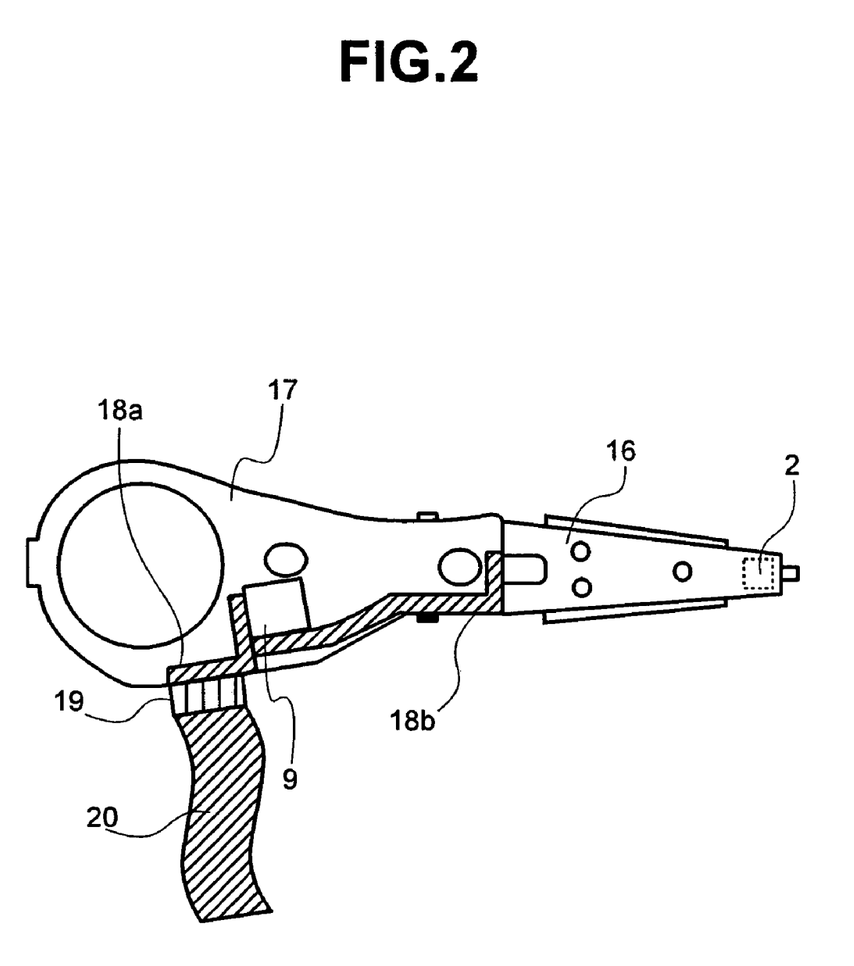
FIG. 2 is a top view of a head suspension assembly provided in the magnetic disk device of FIG. 1.

FIG. 2 is a top view of the head suspension assembly showing a method of mounting the nonvolatile rewritable memory 9. The magnetic head 2 is mounted at the front edge of a suspension 16 and is electrically connected to a connecting terminal 19 by way of FPC 18*a* and FPC 18*b*. A main FPC 20 connects the connecting terminal 19 to the head amplifier 8. The optimized control parameter for the magnetic head is stored in said nonvolatile memory 9, as described above. The nonvolatile memory 9 is connected to the connecting terminal 19 by way of FPC 18*a* and to the head amplifier 8 by way of the main FPC 20.

Figure 3:
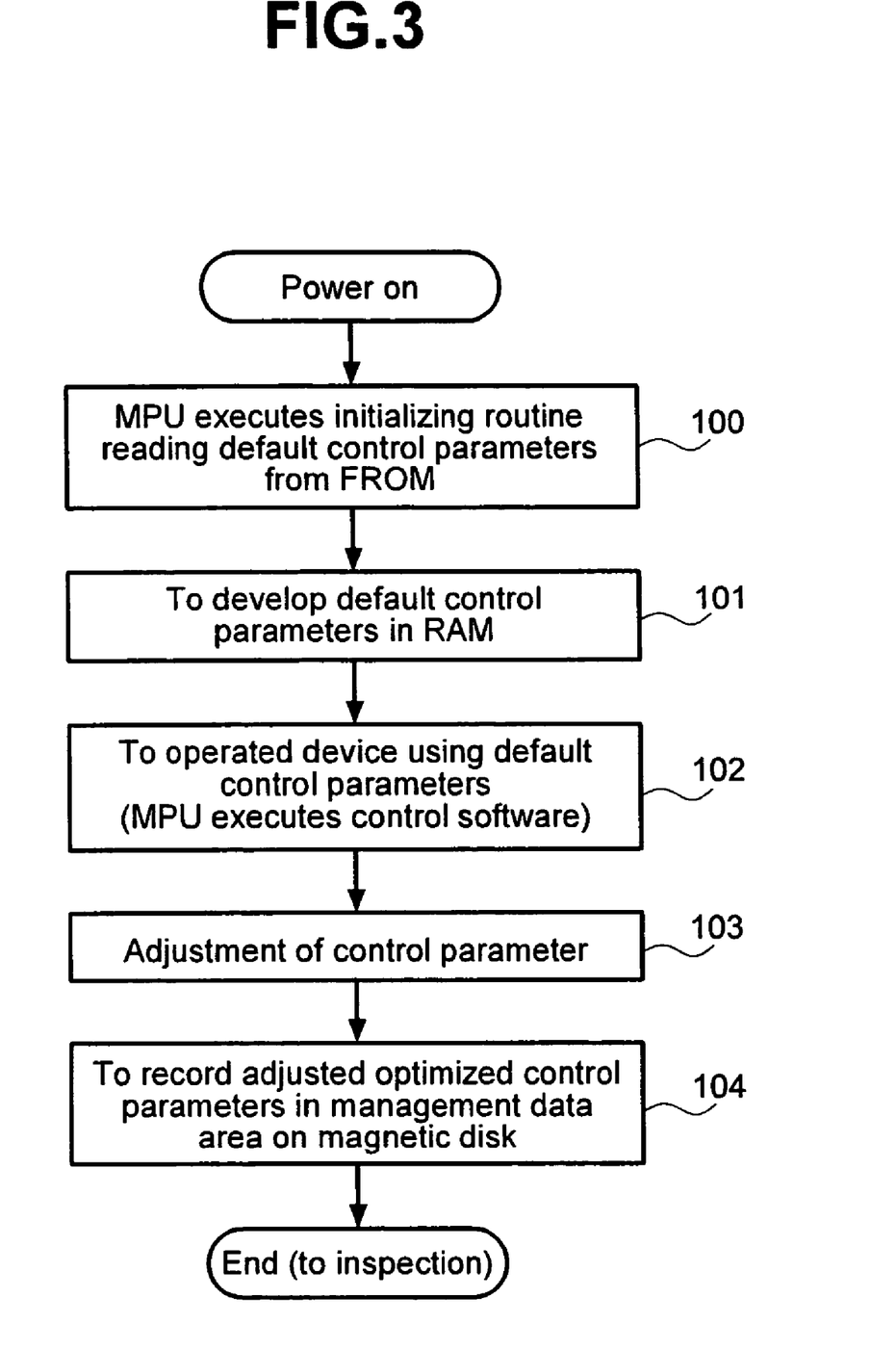
FIG. 3 is a flow chart showing a method of setting up an operation parameter at the time of shipping inspection of a conventional magnetic disk device.

The method of setting the control parameters for the magnetic disk device having the structure shown in FIG. 1 will be described with reference to the flow charts shown in FIG. 3 and FIG. 4, for example, in the case of the shipping inspection of the magnetic disk device of the present invention. FIG. 3 shows a process of setting the control parameters for the inspection of the conventional magnetic disk device having no rewritable nonvolatile memory on the head suspension assembly.

When the power of the magnetic disk device is turned on, default control parameters (three kinds of control parameters as described above, which are specific to the device, concerning the operating mode, and depending on each magnetic head, respectively) are read from the data area of the FROM 15 by the MPU 7 as part of the initializing routine of the control program stored in the FROM 15, which is located on a circuit board outside the head suspension assembly (step 100). The control parameters read out and the control programs to control the drive are developed or transferred to the RAM 14 (step 101), and the rotating operation of the spindle and the seek operation of the magnetic head are executed using the default control parameters transferred into RAM 14 (step 102). Then, the control parameters are adjusted (step 103), and the adjusted and optimized control parameters are recorded in the management area on the magnetic disk (step 104).

Figure 4:
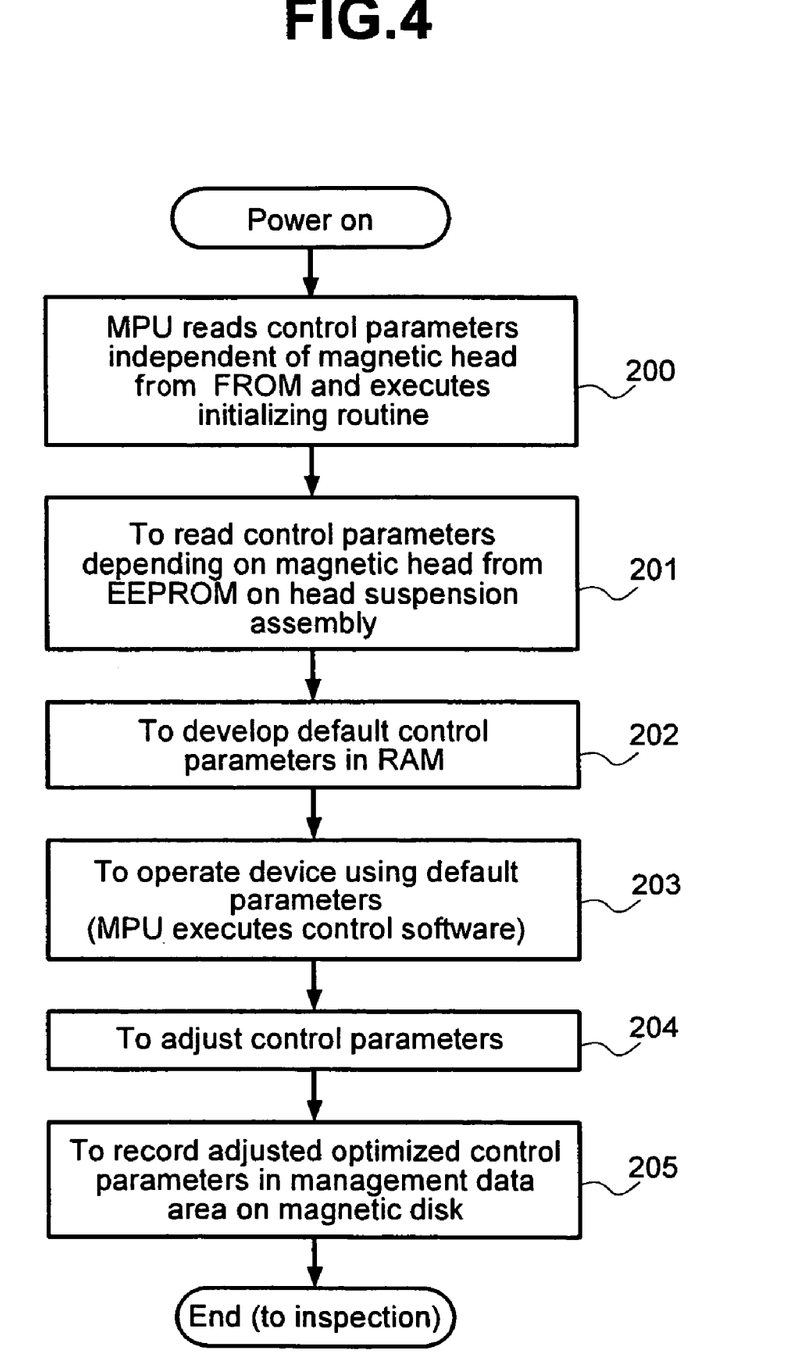
FIG. 4 is a flow chart showing a method of setting up an operation parameter in the magnetic disk device according to the first preferred embodiment of the present invention.

FIG. 4 is a flowchart showing the process of setting control parameters for the inspection of the magnetic disk device of the preferred embodiment of the present invention.

In this flowchart, the main difference from the conventional case shown in FIG. 3 is that this processing method includes the step of reading out the control parameters depending on each of the magnetic heads at a step 201 from a nonvolatile EEPROM disposed on the head suspension assembly. The control parameters read out at this step are not default values that represent an average value for the magnetic heads, but are optimized values having been set for each of the magnetic heads at time of the selecting test performed on the head suspension assembly.

A problem in the conventional case shown in FIG. 3 is that the magnetic disk device is operated using default values which are not optimized for each of the magnetic heads and the head amplifiers at the step 102, so that sometimes the magnetic disk devices do not operate or lapse into unstable operation.

As a preferred embodiment of the present invention, by mounting a rewritable nonvolatile memory on the head suspension assembly and storing therein the optimized control parameters depending on each of magnetic heads, which are optimized to the magnetic head of the head suspension assembly, the instability of the operation of the magnetic disk devices at the time of inspection can be avoided and the yield of the magnetic disk devices can be improved.

More specifically, for example, regarding the bias current of the reproducing head, which is one of the control parameters, the optimum bias current is set up at the time of the selecting test of the head suspension assembly having said reproducing head, and the set value is stored in the nonvolatile memory on said head suspension assembly. At the time of inspection of the magnetic disk device, the optimized control parameters, depending on each of the magnetic heads, such as the bias current of the reproducing head (the control parameters other than the bias current, which depend on each magnetic head, have been stored also in the nonvolatile memory), are read out from the nonvolatile memory and transferred to the RAM 14 (step 202); and, further, the control parameters specific to the magnetic disk device and the control parameters concerning the operating mode are read from the FROM 15 and transferred to the RAM ("default control parameters" in the step 202 means both control parameters read from the FROM and the optimized control parameters read from the EEPROM).

Subsequently, the device shipping inspection is executed by operating the magnetic disk device while actually using all of the control parameters transferred to the RAM from the FROM and EEPROM; in this regard, all the control parameters are adjusted so as to optimize the operation of the magnetic disk devices (step 204), and the adjusted optimized control parameters are recorded in the management data area on the magnetic disk (step 205). At step 204, when, among the all optimized parameters, the value of the control parameter that depends on a particular magnetic head is varied from the value stored in the EEPROM, the control parameters that are varied and adjusted can be restored by rewriting. Then, the rewritten values of the control parameters can be utilized effectively in case the head carriage assembly, which is an assembly of the head suspension assemblies, is removed and reinstalled into another magnetic disk device of the same type.

[Second Preferred Embodiment of the Present Invention]

Figure 5:
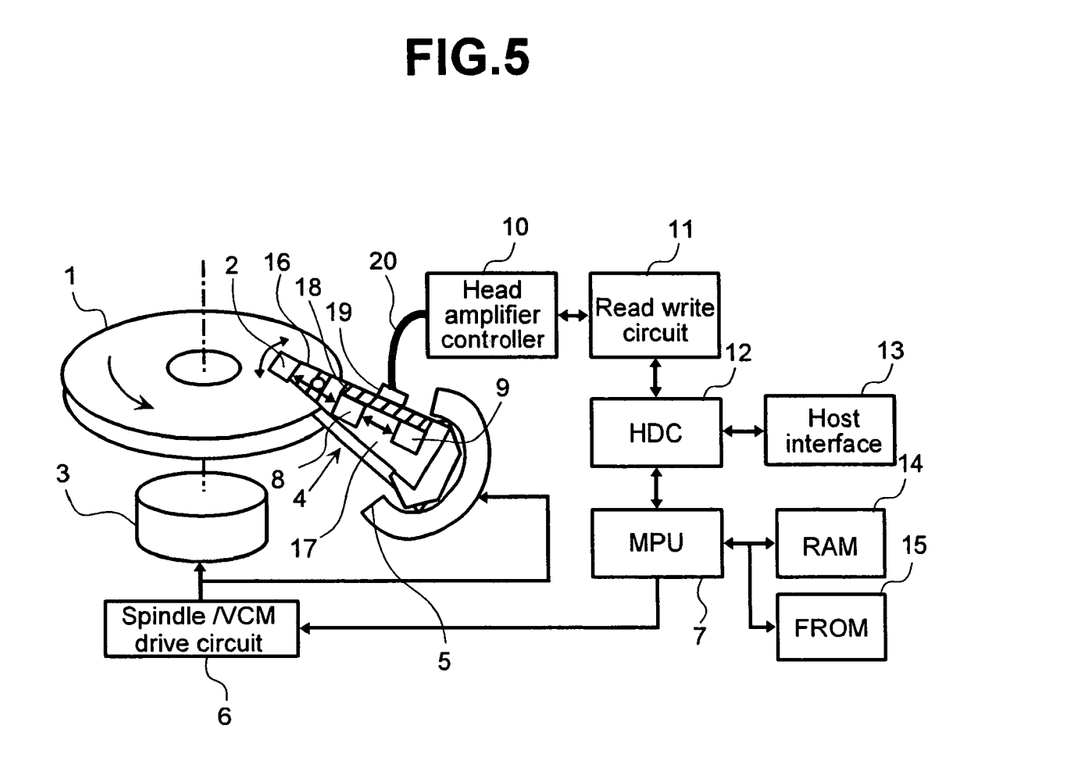
FIG. 5 is a schematic block diagram illustrating the whole structure of a magnetic disk device representing a second preferred embodiment of the present invention.

FIG. 5 is a diagram illustrating the overall structure of a magnetic disk device according to a second preferred embodiment of the present invention. In FIG. 5, magnetic disk 1, magnetic head 2, spindle motor 3, voice coil motor 5, spindle/VCM drive circuit 6, MPU 7, read write circuit 11, HDC 12, host interface 13, RAM 14, FROM 15, connecting terminal 19 and main FPC 20 have the same or similar structure, function and operation as corresponding elements of the first embodiment of the present invention shown in FIG. 1, and so, the description of these elements which are included in FIG. 1 can be applied here as well.

Each magnetic head 2 is electrically connected to a head amplifier 8 by means of a flexible printed circuit board (FPC) 18 that is fixed on a suspension 16 and an arm 17, which elements comprise a head suspension assembly 4. The head amplifier 8 amplifies the reproducing signal from the reproducing head of the magnetic head 2, converts the digital write signal from the read/write circuit to an analog signal waveform, and drives the recording head of the magnetic head 2.

A head amplifier controller 10 switches the head amplifiers 8 provided in each head suspension assembly, transmits the recording data output from the read/write circuit 11 to each head amplifier 8, receives an amplified reproducing signal from each head amplifier 8, and transmits the amplified reproducing signal to the read/write circuit 11. The head amplifier in FIG. 1 has both of the functions above-described of the head amplifier 8 and the head amplifier controller 10.

In the second preferred embodiment of the present invention, the head amplifier 8 is mounted on the head suspension assembly 4 in addition to the nonvolatile EEPROM 9, and the head amplifier and the nonvolatile memory are electrically connected with the FPC 18, which is fixed on the suspension and the arm. The electric connection is such that one of the terminals of the head amplifier 8 is connected to the input output terminal of the magnetic head 2, the other terminal of the head amplifier 8 is connected to the connecting terminal 19 (connecting point with the main FPC 20) of the FPC 18, and EEPROM 9 is connected to the connecting terminal 19 and a third terminal of the head amplifier 8 (for example, a terminal for controlling the amplifier gain).

As control parameters used in the control programs of the magnetic disk device, there are the control parameters specific to the device, but not depending on each magnetic head or the head amplifier, control parameters concerning the operating mode of the device, and parameters depending on each of the magnetic heads and the head amplifiers. As the parameters specific to the device, but not depending on the magnetic head or the head amplifier, there are the serial number of the device, the revision number of the firmware, and defect address data that identifies positions of defects on the magnetic disks. As the parameters concerning the operating mode of the device, there are the waiting time during which rotation of the spindle reaches the normal speed after the power is turned on, the operating mode indication as to whether the spindle is spun up or not just after the power has been turned on (Power On spin up mode), the master/slave operating mode, and the ON/OFF status of a cache memory. As the control parameters depending on each magnetic head or head amplifier, there are the recording current of the magnetic head, the bias current of the reproducing head, the resistance of the reproducing head, the offset value of the recording head and reproducing head, the gain of the head amplifier, the amount of overshoot of the rerecording current waveform, the amount of write pre-compensation, the cutoff frequency of a low pass filter (LPF), and the amount of boost of the LPF. These control parameters, depending on each magnetic head or head amplifier, can be set to an optimum value corresponding to characteristics of each zone formed on the magnetic disk.

The nonvolatile memory 9 is a rewritable EEPROM which merely stores merely the parameters depending on each magnetic head or head amplifier among the above-described control parameters.

In the selecting measurement of the magnetic heads of the head suspension assembly, the adjusted and optimized control parameters are recorded in a nonvolatile memory by the MPU in a selection tester. After the magnetic heads are assembled into the magnetic disk device, at the time of shipment inspection of the magnetic disk device, the MPU 7 reads out the control parameters in the nonvolatile memory through the head amplifier controller 10, the read/write circuit 11, and the HDC 12.

Figure 6:
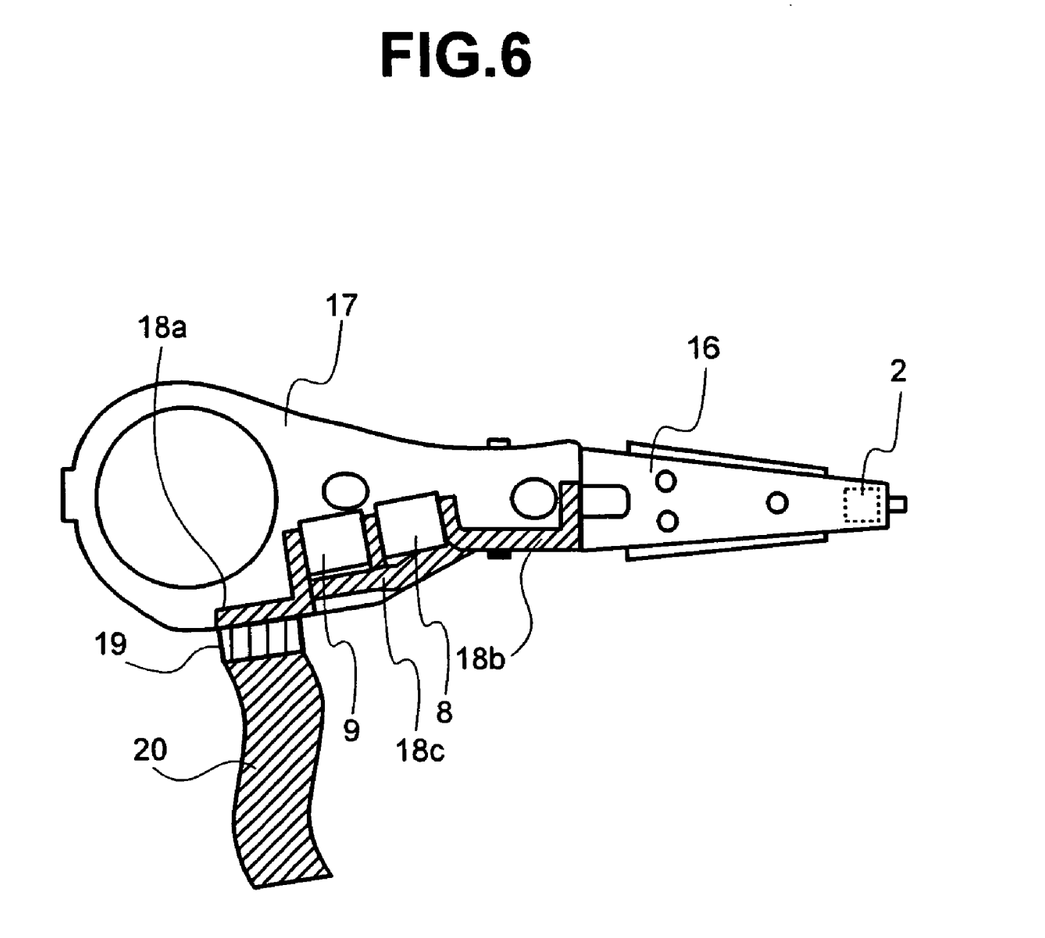
FIG. 6 is a top view of a head suspension assembly provided in the magnetic disk device of FIG. 5.

FIG. 6 is a top view of the head suspension assembly showing how the nonvolatile memory 9 is mounted. The magnetic head 2 is mounted at the front edge of the suspension 16 and is electrically connected to the head amplifier 8 by the FPC 18b. The head amplifier 8 is also electrically connected to the FPC 18c, and the FPC 18c is connected to the connecting terminal 19. The connecting terminal 19 is connected to the head amplifier controller 10 through a main FPC 20. The optimized control parameters depending on the magnetic head as described above are stored in the nonvolatile memory 9. The nonvolatile memory 9 is connected to the connecting terminal 19 through the FPC 18a, and, further, it is connected to the head amplifier controller 10 through the main FPC 20.

The method of setting the control parameters for the magnetic disk device having the structure shown in FIG. 5 will be described with reference to the flow charts of FIG. 3 and FIG. 7, for example, in the case of the shipping inspection of the magnetic disk device of the present invention. FIG. 3 shows the process of setting the control parameters at the time of inspection of the conventional magnetic disk device having no rewritable nonvolatile memory on the head suspension assembly, and this method has been explained already in connection with the description of the first preferred embodiment of the present invention.

Figure 7:
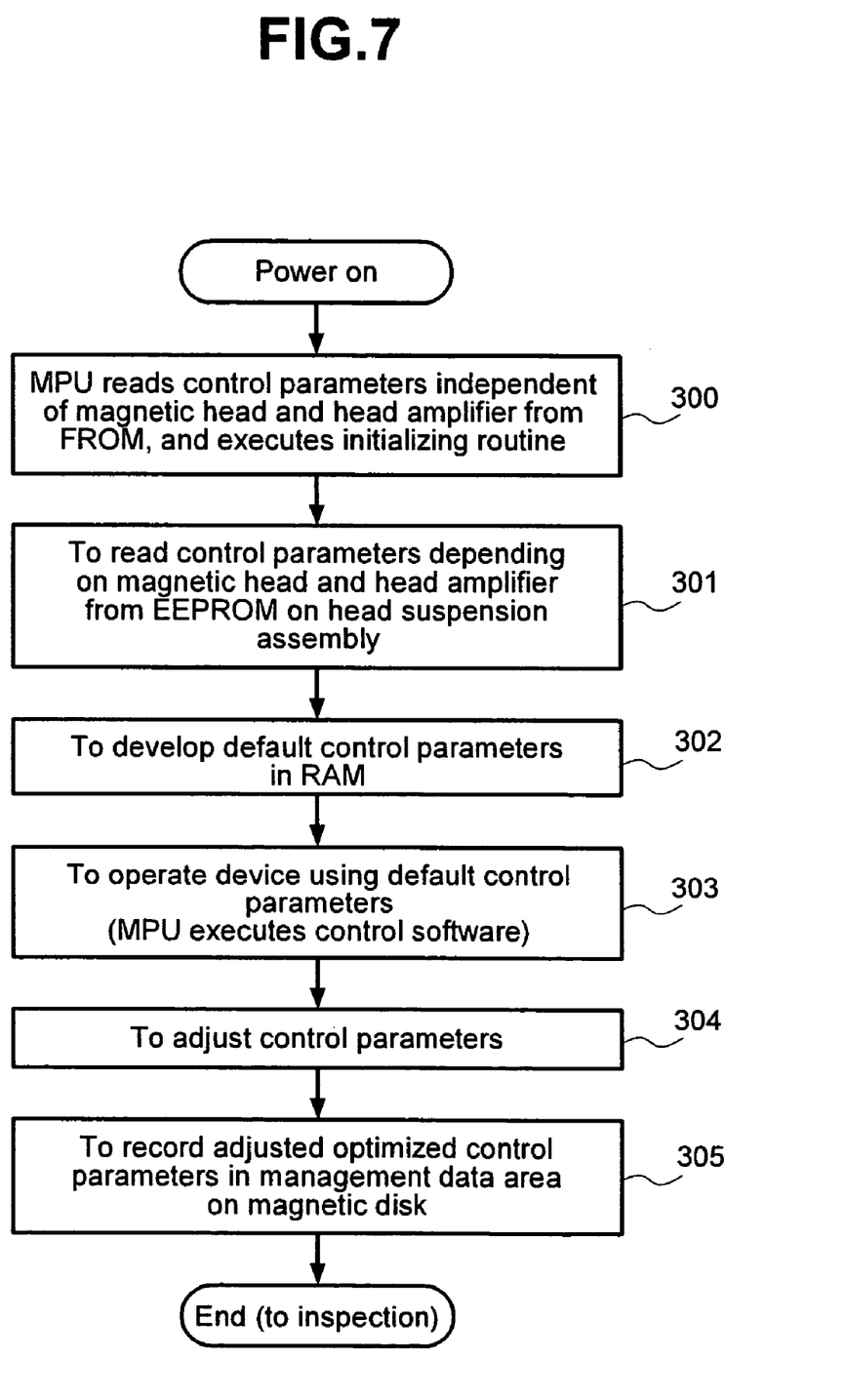
FIG. 7 is a flow chart showing a method of setting up an operation parameter of the magnetic disk device according to the second preferred embodiment of the present invention.

FIG. 7 shows the process of setting the control parameters at the time of inspection of the magnetic disk device of the second preferred embodiment of the present invention. In FIG. 7, the main difference from the conventional case shown in FIG. 3 is that this processing method includes the step of reading out the control parameters depending on each of the magnetic heads and the head amplifiers at a step 301 from a nonvolatile EEPROM disposed on the head suspension assembly. The control parameters read out at this step are optimized values which have been set up for each of the magnetic heads previously during the selecting test of the head suspension assembly.

The problems in the conventional case shown in FIG. 3 are that the magnetic disk device is operated using default values which are not optimized for each of the magnetic heads and the head amplifier at the step 102, so that sometimes the magnetic disk devices do not operate or lapse into unstable operation.

According to the preferred embodiment of the present invention, by mounting a rewritable nonvolatile memory on the head suspension assembly and storing in it the optimized control parameters depending on every magnetic head and the head amplifier, which are optimized for the head suspension assembly, the instability of the operation of the magnetic disk devices at the time of inspection can be avoided and the yield of the magnetic disk devices can be improved.

Further, in the head suspension assembly of this preferred embodiment of the present invention, the amplification gain of the head amplifier can be measured and stored previously in the nonvolatile memory before the selecting measurement in of the head suspension assembly and can be used at the time of the selecting measurement. Hereby, the signal levels of the magnetic heads in the selection in of the head suspension assembly can be measured accurately, and erroneous acceptance of defective products can be prevented, so that the yield of the magnetic disk devices can be improved.

Explanation of an actual example will be given. The optimized control parameters concerning the magnetic heads, such as the bias current of the reproducing head, etc., are obtained during the selecting test of the head suspension assembly shown in FIG. 6 and are stored in EEPROM 9, and the optimum values of the control parameters concerning the head amplifier 8, such as the amplifier gain, the amount of the overshoot of recording current, are obtained previously by testing of a single head amplifier before the selecting test of the head suspension assembly. These obtained values are stored in EEPROM 9. Through a procedure similar to step 202 to step 205, all of the control parameters are adjusted, the optimized control parameters after the adjustment are recorded in the management data area on the magnetic disk, or the adjusted control parameters of the magnetic heads and the head amplifiers are rewritten in the EEPROM 9.

Thus, if the shipping inspection of the magnetic disk device, including the test of the recording and reproducing characteristics, is executed using the optimized values concerning the magnetic head and the head amplifier, which are optimized during the test of the head suspension assembly, the rejection rate is reduced in comparison with that of the conventional case shown in FIG. 3, where the shipping inspection of the recording and reproducing characteristics is executed using average default values for the magnetic head and the head amplifier (in case the default values are close to the upper or lower allowable limit of the magnetic heads to be inspected, there is a possibility of rejection of the magnetic disk device during the shipping test of the recording and reproducing characteristics). When the head suspension assembly is a chip-on-suspension type or a chip-on-arm type, during the selecting measurement of the magnetic heads of the head suspension assembly, the control parameters of the magnetic heads and the head amplifiers are optimized independently and stored respectively in the nonvolatile memory 9. The shipping inspection of the magnetic disk device is executed using these optimum values, the signal level at the reproducing output terminal of the magnetic head can be measured accurately because the control parameters of the head amplifier are given previously, and the adjustment of the control parameters of the magnetic head can be executed (step 304).

In this preferred embodiment of the present invention, an example of the configuration is disclosed, in which the head amplifier 8 and the rewritable nonvolatile memory 9 are placed as separate elements on the head suspension assembly 4, as shown in FIG. 5 and FIG. 6, but the present invention is not limited to these preferred embodiments, since various modifications are possible within the scope of this invention. For example, it is possible for both the head amplifier 8 and the rewritable nonvolatile memory 9 to be accommodated in one package. By employing this configuration, the amplification gain of the head amplifier can be measured in the form of a chip and can be stored in the rewritable nonvolatile memory, the testing steps can be decreased, and the manufacturing cost can be reduced by reduction of the number of components.

As described above, according to the magnetic disk device and the head suspension assembly of the first and the second preferred embodiments of the present invention, a data storage is provided on the head suspension assembly; therefore, the optimized control parameters of each of the head suspension assemblies can be stored in the data storage at the time of selecting measurement of the head suspension assembly, and the stored optimized control parameters can be utilized in the shipping inspection of the magnetic disk devices. Therefore, since control parameters that are optimized for each head suspension assembly can be used, the magnetic disk device can be inspected at a satisfactory state regardless of the variations of the characteristics of the magnetic head and the head amplifier, and the yield of the devices can be improved.

According to the present invention, by providing the rewritable nonvolatile memory on the head suspension assembly and storing the optimized control parameters of the magnetic heads and/or the head amplifier in this memory, the yield of the magnetic disk device using this head suspension assembly at the time of shipping inspection can be improved.

According to the present invention, by measuring the amplifier gain of the head amplifier in advance and storing it in the rewritable nonvolatile memory, the head output signal level can be measured directly and accurately at the time of selecting measurement of the head suspension assembly.

What is claimed is:

1. A head suspension assembly comprising:
   a magnetic head;
   an arm which is supported so as to rotate;
   a suspension having one end which is fixed to an end of said arm and an other end which mounts said magnetic head;
   a nonvolatile memory which is mounted on said suspension assembly, and stores control parameters of said magnetic head;
   a connecting terminal which is mounted to said arm; and
   a signal transmission line which electrically connects said connecting terminal to said nonvolatile memory and said magnetic head;
   wherein said connecting terminal enables transmission of signals at least one of to and from said head suspension assembly, said nonvolatile memory and said magnetic head.

2. The head suspension assembly according to claim 1, wherein said nonvolatile memory is mounted on said arm, and said signal transmission line is a flexible printed circuit board fixed on said arm.

3. The head suspension assembly according to claim 1, further comprising a head amplifier which is mounted on said suspension assembly, and transmits and receives signals to and from said magnetic head, wherein said signal transmission line electrically connects said connecting terminal to said magnetic head through said head amplifier.

4. The head suspension assembly according to claim 1, wherein said nonvolatile memory and a head amplifier are mounted on said arm, and said signal transmission line is a flexible printed circuit board fixed on said arm.

5. The head suspension assembly according to claim 1, wherein the head suspension assembly forms part of a magnetic disk device.

6. A magnetic disk device comprising:
   a magnetic disk which records data;
   a read/write circuit which has a decoding function for a data reproducing operation;
   head suspension assembly including:
   a magnetic head, an arm which is supported so as to rotate, a suspension having one end which is fixed to an end of said arm and an other end which mounts said magnetic head;
   a nonvolatile memory which is mounted on said suspension assembly, and stores control parameters of said magnetic head;
   a connecting terminal which is mounted to said arm; and
   a signal transmission line which electrically connects said connecting terminal to said nonvolatile memory and said magnetic head;
   a spindle motor which rotates said magnetic disk arm;
   a voice coil motor which rotates said arm;
   a controller which controls a read/write operation by said magnetic head using said control parameters stored in said nonvolatile memory; and
   a main flexible printed circuit which electrically connects said controller to said connecting terminal.

7. The magnetic disk device according to claim 6, wherein said nonvolatile memory is mounted on said arm, and said signal transmission line is another flexible printed circuit board fixed on said arm.

* * * * *